United States Patent [19]

Emery

[11] Patent Number: 4,850,633
[45] Date of Patent: Jul. 25, 1989

[54] NON-INVASIVE FASTENER FOR A TRUCK BED LINER

[75] Inventor: Phillip L. Emery, Portage, Wis.

[73] Assignee: Penda Corporation, Portage, Wis.

[21] Appl. No.: 144,536

[22] Filed: Jan. 14, 1988

[51] Int. Cl.⁴ ...................... B62D 33/02; F16B 37/00
[52] U.S. Cl. .................................... 296/39.2; 411/432; 411/708; 224/42.42
[58] Field of Search ................. 296/39 R; 411/84, 85, 411/174, 175, 432, 908; 224/42.42

[56] References Cited

U.S. PATENT DOCUMENTS

| | | | |
|---|---|---|---|
| 2,233,230 | 2/1941 | Tinnerman | 411/175 |
| 4,540,214 | 9/1985 | Wagner | 296/39 R |
| 4,572,568 | 2/1986 | Kapp et al. | 296/39 R |
| 4,595,229 | 6/1986 | Wagner | 296/39 R |
| 4,659,133 | 4/1987 | Gower | 296/39 R |
| 4,707,021 | 11/1987 | Meier et al. | 296/196 |
| 4,728,235 | 3/1988 | Patti | 411/174 |
| 4,740,026 | 4/1988 | Wagner | 296/39 R |

*Primary Examiner*—Dennis H. Pedder
*Attorney, Agent, or Firm*—Lathrop & Clark

[57] ABSTRACT

A fastener (10) is disclosed for fastening a truck bed liner (58) to the side walls (50) of a truck bed. The side walls (50) are bounded at the top edge by a top rail (52) extending inwardly from each side wall (50) and a side rail extending downwardly from the inner margin (56) of the top rail (52). The fastener (10) is designed to be used for a truck bed liner (58) having a flange (62) that fits over the top of the top rail (52). The fastener (10) has a body (12), clip (18), screw (14), and washer (16). In the use of the fastener (10), the truck bed liner (58) is loosely positioned against the side wall (50). The screw (14) is inserted through a hole (63) in the liner (58), with the washer (16) being behind the head (64) of the screw (14). The clip (18) slides over a hole (30) of the body (12), and the screw (14) is threaded through the body (12) and clip (18). The body (12) fits behind the side rail (54) of the side wall (50) and the truck bed liner (58) is drawn toward the wall as the screw (14) is tightened. Upon rotation of the head of the screw (14), the body (12) rotates until a finger (68) of the body (12) abuts against the inner margin (56) of the top rail (52), thereby holding the body (12) in place as the screw (14) is tightened. The hole (30) of the body (12) is angled so that the front surface (26) of the body (12) initially contacts the side rail (54) of the side wall (50) at an acute angle. As the screw (14) is tightened, the angle closes, which causes a rotational force against the length of the screw (14), and which is transferred to the flange (62), causing the flange (62) to be engaged against the top rail (52).

21 Claims, 2 Drawing Sheets

NON-INVASIVE FASTENER FOR A TRUCK BED LINER

FIELD OF THE INVENTION

This invention relates to fasteners for attaching truck bed liners to the body of a pick-up truck or the like.

BACKGROUND OF THE INVENTION

Pick-up trucks and the like with truck beds have become popular vehicles for transportation of cargo. The metal surfaces of the truck beds are generally finished with paint by the manufacturer. To protect these surfaces from the weather, from the impact and scuffing of cargo, and to mask surfaces that may have already been damaged, truck bed liners have become increasingly popular. Such liners are usually of one piece plastic construction, and are formed to fit inside the truck bed and generally conform in size and shape to the truck bed, such that the painted metal surface of the truck bed is covered and protected, while retaining most of the cargo capacity of the truck bed. Although such truck bed liners have usually been fastened to the truck cargo bed by bolt or screw fasteners extending through the liner and the side or front walls and rails of the truck cargo bed, pick-up truck owners are increasingly desirous of obtaining non-invasive fasteners which do not require that holes be drilled in the truck cargo bed at the time of installation.

Other fasteners in the prior art are difficult to manipulate and require large holes in the wall of the truck liner. The fasteners sometimes protrude off of the wall of the truck liner, causing difficulties when cargo is slid against the walls.

Another problem that is especially prominent in truck liners that fit over the rails that bound the side walls of truck beds, is that the use of screw or bolt fasteners to rigidly secure the liner flange to the top of the wall may cause distortion and warpage of the liner flange, due to the differing coefficients of heat expansion of the plastic liner and metal side walls. Such liner flanges present an aesthetically undesirable appearance, and cause gaps between the liner and the truck bed which will more easily admit moisture and debris.

Accordingly, a need has existed for non-invasive fasteners that do not require holes in the surface of the truck bed, do not damage the truck bed liner or the cargo that may be contained within the bed, and will fasten a truck bed liner securely within a truck bed without distortion of the liner flanges.

SUMMARY OF THE INVENTION

In accordance with the present invention, a fastener for a truck bed liner has a screw that threadedly engages with a body, the screw being inserted into a pre-drilled hole in the truck bed liner. The fastener is typically employed to fasten a liner in a truck bed having a side wall bounded at its upper end by a top rail extending inwardly from each side wall and having a side rail that extends downwardly from the inner margin of the top rail. The protrusion of the head of the screw beyond the inside of the truck bed liner into the cargo space of the liner is minimal. The screw is threaded into a hole in the fastener body, the body being positioned behind the side rail of the truck cargo bed side wall. The body is shaped so that as the screw is tightened, the body rotates with the screw until a finger of the body abuts against the inner margin of the top rail. The body is thus held in place from further rotation as the screw is being tightened, and the truck liner is drawn correspondingly toward the side wall of the truck bed. When fully tightened, the body and the truck bed liner grip the downwardly extending side rail of the truck bed in a vice-like manner.

The hole in the body into which the screw is tightened is angled so that the front surface of the body contacts the side rail of the side wall at an acute angle. As the screw is tightened, the angle is closed and a pivotal force is created along the length of the screw. This pivotal force is ultimately transferred to the flange of the truck bed liner. The flange is thus tightly engaged against the top rail, minimizing gaps between the top rail and the flange. The incorporation of the angled hole in the body contributes to the elimination of aesthetically undesirable ripples or warping across the length of the flange.

The fastener of the present invention is easy to install and remove from the side walls of the truck bed. There are no special tools or attachments necessary, and the aesthetic appearance of both the liner and the side walls of the truck bed are preserved.

DESCRIPTION OF THE PREFERRED EMBODIMENT

Figure 1:
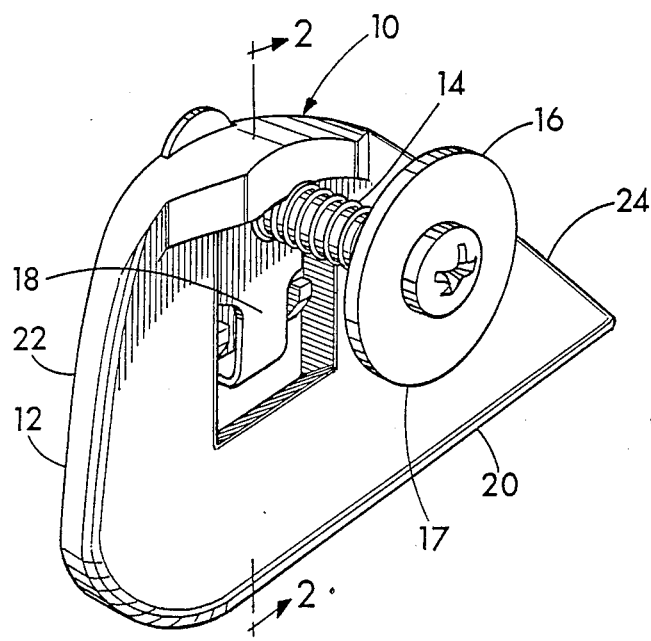
FIG. 1 is a perspective view of the fastener of the present invention.
Figure 2:
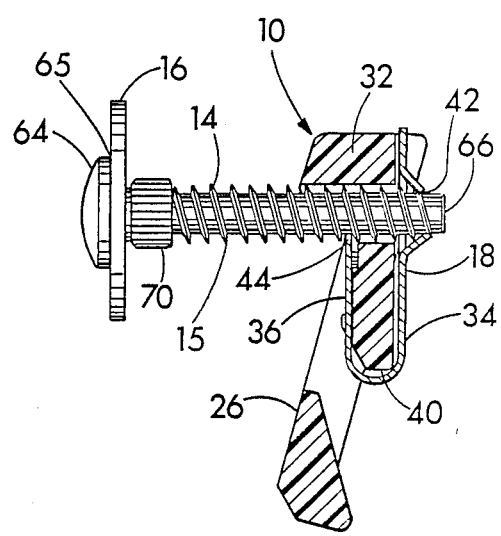
FIG. 2 is a side view of the fastener.
Figure 3:
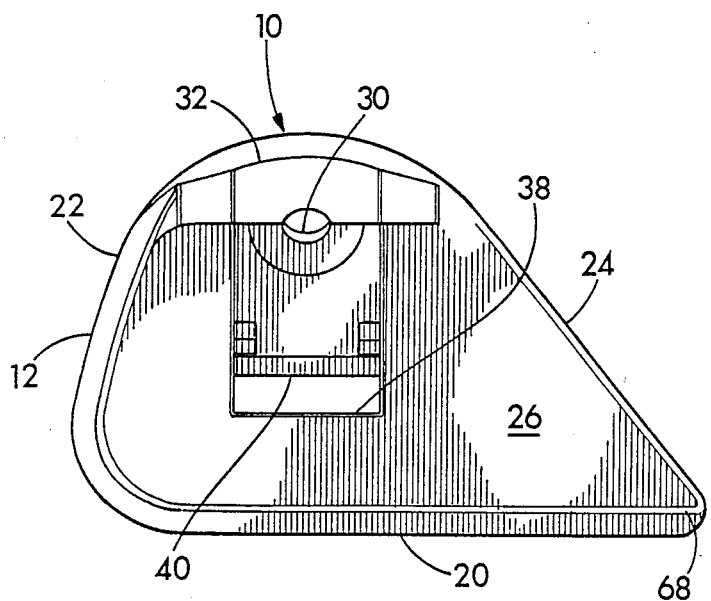
FIG. 3 is a front view of the body of the fastener.
Figure 4:
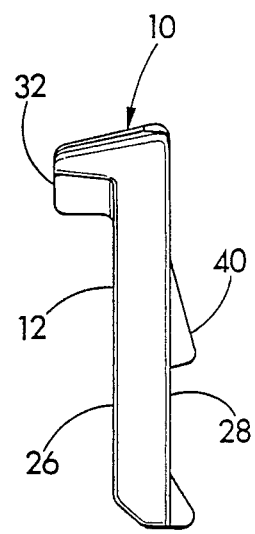
FIG. 4 is a side view of the body of the fastener.
Figure 5:
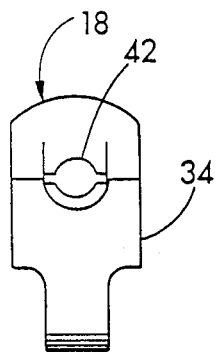
FIG. 5 is a front view of a fastener clip.

With reference to the drawings, a preferred embodiment of a fastener for a truck bed liner constructed in accordance with the invention is shown generally at 10 in FIGS. 1 and 2. The elements of the preferred fastener 10 include a body 12, a screw 14, a washer 16, and a clip 18. As shown in FIG. 3, the body 12 is generally triangular in shape, having an outer margin defined by a base 20, two edges 22 and 24, a front surface 26, and a back surface 28. The body 12 also has a hole 30 which passes through the thickness of the body 12 and is bounded at one end of the front surface 26 by a shoulder 32. The clip 18, as shown in FIG. 5, is folded over to form two sides 34 and 36. The body 12 has an aperture 38 and lip 40 so that the clip 18 fits through the aperture 38 and the sides 34 and 36 of the clip form-fit over the lip 40. Side 34 of the clip 18 has a punched hole 42 that mates with the screw 14 in threaded relation. The hole 30 of the body 12 is aligned with the hole 42 and a half-moon 44 on the edge of side 34. The threaded portion 15 of screw 14 is engaged with the body 12 by passing through the shoulder 32, the half-moon 44 on the edge of side 34 of the clip 18, the hole 30 in the body, and the punched hole 42 in the clip 18. The half-moon 44 and the punched hole 42 both operatively engage the threads of the screw 14.

The hole 30 is located within the outer margin of the body 12 in eccentric relation to define a pivot axis. A finger 68 generally is defined by the portion of the outer margin most distant from the hole 30. Upon turning of the threadedly engaged screw 14, the finger 68 is designed to abut against a transverse surface spaced from the screw to prevent 360° rotation of the body 12 about the pivot axis, thereby holding the body 12 in place as the screw 14 is progressively turned. The preferred embodiment of the body 12 is generally triangular. The angle between base 20 and edge 22 may be preferably about 75° and is rounded to a substantial radius so that the portion of the body formed thereby extends substantially less distance from hole 30 than finger 68; the angle between base 20 and edge 24 may be preferably about 53° and rounded to a small radius of curvature for strength without significantly limiting the length of finger 68 formed thereby; and the angle between edges 22 and 24 may be preferably about 52°, and rounded to a substantial radius. As best shown in FIG. 2, the hole 30 is angled approximately 15° from a line perpendicular to the front surface 26 of the fastener 10 so that the screw 14 and the front surface 26 form an acute angle. The axis of the hole 30 is perpendicular to the lip 40. The body is preferably molded of high density polyethylene, but could also be molded from other plastics, or stamped from metal. The screw 14 of the fastener 10 is preferably a #14 sheet metal screw that has a shoulder 70 and does not have a sharp point at the end 66. The washer 16 has an inner diameter (not shown) smaller than the head 64 of the screw and the shoulder 70, and is held in place between the shoulder 70 and the head 64 to form a head assembly 65. The word "head" as used herein shall refer to both the head 64 and the head assembly 65.

Figure 7:
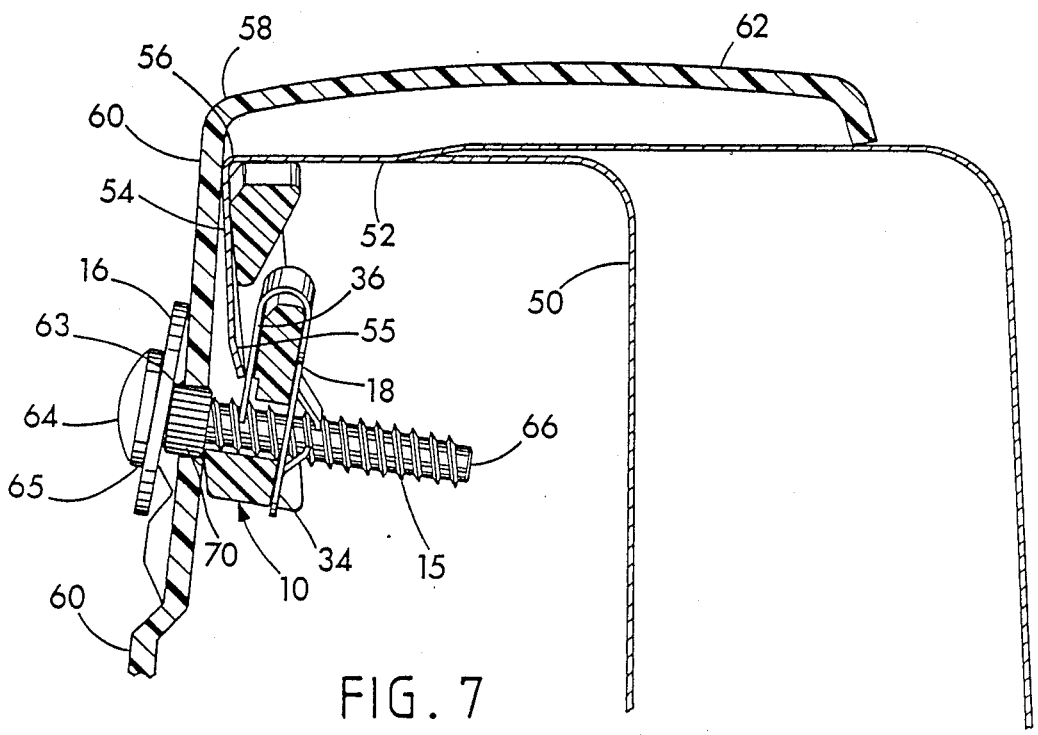
FIG. 7 is a partial cross-section view of the truck bed, liner and installed fastener.

The fastener 10 of the present invention is used in pick-up trucks or the like having a bed with two opposed side walls 50, one of which is shown in FIG. 7. Such side walls 50 have a top rail 52 which extends inwardly from each side wall 50 and a side rail 54 extending downwardly from an inner margin 56 of the top rail 52. The fastener 10 is designed to fasten truck bed liners 58 along a length of each side wall 50 of the truck bed, and is particularly well suited for those truck bed liners that fit over the top of the top rail 52 of each side wall 50 of the truck bed. These truck bed liners 58 typically have a side wall 60 that covers the length of each truck side wall 50, and a flange 62 that fits over the top of the top rail 52. The fastener 10 also works well with liners which do not have flange 62, and may also be adapted to work with some truck bed liners that fit under the top rail 52. The fastener 10 is adapted to be used to secure a second member such as a liner against first member having a flange surface adjacent to a transverse surface reachable by the finger 68, as will be more fully explained below.

Figure 6:
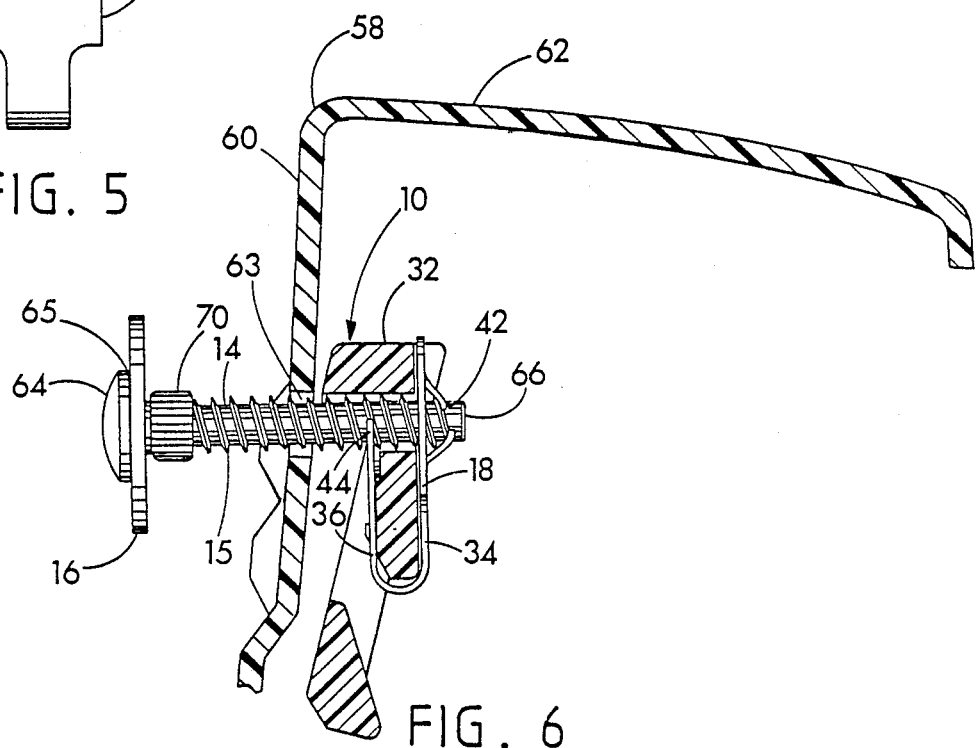
FIG. 6 is a partial cross-section view of the liner and the fastener prior to installation.

In the use of the fastener 10, the screw 14 and washer 16 are disengaged from the body 12 and clip 18. The screw 14 is inserted through a hole 63 in the truck bed liner 58 so that the head 64 of the screw 14 is on the interior of the truck bed liner 58 and the threaded portion 15 extends exteriorly. The diameter of the hole 63 is large enough to accommodate the shoulder 70 of the screw 14, and smaller than the outer diameter 17 of the washer 16. If the preferred washer 16 is not used, the hole 63 must be smaller than the outer diameter of the screw head 64. It is preferred that the head assembly 65 be such that the size of the liner hole 63 may be minimized. The body 12, with clip 18 in place, is then turned onto the end 66 of the screw 30 to engage the first several threads, as shown in FIG. 6. The truck bed liner 58 is then loosely positioned against each of the side walls 50 of the truck bed. At this point, the body 12 is behind the side rail 54.

The truck bed liner is secured to the side wall 54 of the truck bed by turning the screw 14. Upon clockwise turning of the screw 14, the body 12 and clip 18 will simultaneously rotate with the screw 14 until the body 12 reaches a point where it is locked in place, the method of which is discussed further below. As the screw 14 is tightened, the body 12 is drawn toward the head 62 of the screw 14. As the body 12 is drawn in the direction of the head 64 of the screw 14, the body 12 engages the back side 55 of the side rail 54, and the truck bed liner 58 is correspondingly drawn toward the side wall 50 of the truck bed. The truck bed liner 58 typically will have several fasteners 10 along the length of each of the side walls 50. The truck bed liner 58 is secured when each of the screws 14 corresponding to each of the fasteners 10 is tightened until the shoulder 32 engages the liner 58. The shoulder 32 prevents overtightening of the fastener, thereby allowing for some displacement between the liner 58 and the side wall 50 of the truck bed in response to thermal expansion. An important result of this mode of fastening of the present invention is that the fastener 10 is non-invasive, i.e. the fastener 10 does not require drilling, punching, or other intrusion through or into the bed of the truck. Instead, the fastener body 12 and the liner 58 engage the side rail 54 in a vice-like manner. The fastener 10 preserves the integrity of the metal surface of the bed and its painted finish in all respects.

As noted earlier in this description, the hole 30 of the body 12 into which the screw 14 is inserted is acutely angled 15° from a line perpendicular to the front surface 26 of the fastener 10. When the front surface 26 of the body 12 contacts with the side rail 54 of the side wall 50, the body 12 tends to pivot to align with the surface of the side rail 54. This pivotal movement causes a force to be transferred through the screw 14 to the truck bed liner 58, so that the flange 62 of the liner 58 is torqued against the top rail 52. This pivotal force urges the flange 62 against the top rail 52, so that gaps between the flange 62 and the top rail 52 are minimized. Accordingly, the fit of the flange 62 on the top rail 52 is optimized, and the opportunity for water and debris to pass between the flange 62 and the top rail 52 is minimized. An alternate embodiment that would put the same pivotal force upon the truck bed liner 58 would be provided by an angled front surface 26 with the hole 30 perpendicular to the back surface 28. A second alternate embodiment would be provided by a foot or other protrusion on the front surface 26 along the base 20 that would contact the side rail 54 before the screw 14 is tightened to create the desired pivotal force.

The truck bed liner 58 may be removed from the side wall 50 of the truck bed in the reverse manner of the above listed steps. Counter-clockwise rotation of the screw 14 will eventually cause the body 12 and clip 18 to rotate with the loosening screw 14 for less than 360° until the finger 68 again abuts against the inner margin 56 of the top rail 52. The body 12 will then progressively draw away from the head 64 of the rotating screw 14 until the screw 14 and washer 16 are again disengaged from the body 12 and clip 18 and the liner 58 is loose in the truck bed.

It is understood that the invention is not confined to the particular construction and arrangement of parts herein illustrated and described, but embraces all such modified forms thereof as come within the scope of the following claims.

What is claimed is:

1. A non-invasive fastener for securing a truck bed liner having a pair of opposed side walls with outwardly extending flanges in a truck bed having a pair of opposed side walls, a top rail extending inwardly from each truck bed side wall and a side rail having a back side extending downwardly from the top rail, the fastener comprising:
    (a) a screw having a threaded portion and a head portion, the threaded portion being adapted to extend through a hole in one of the truck bed liner side walls and the head portion being of larger diameter than the threaded portion to prevent passage of the head portion through said hole sized to pass the threaded portion; and
    (b) a body having an outer margin and a hole located in eccentric relation with the outer margin to define a pivot axis, the outer margin being shaped to form a finger at a point on the outer margin of maximum distance from the pivot axis, the body being threadedly engageable on the screw, the finger being adapted to abut one of said truck bed top rail surfaces to prevent 360° rotation of the body when the screw is rotated in said liner side wall hole so that the body may be tightened and loosened on the screw to respectively secure and disengage the truck bed side rail between the body and the truck bed liner, and wherein the body has a front surface which extends at a first acute angle with respect to the axis of the hole in the body so that the body front surface will contact the truck bed side rail back surface at a second acute angle, and tightening of the screw will close the second angle and create a pivotal force that will be transferred to the flange of the truck bed liner to engage the flange against the top rail.

2. The non-invasive fastener of claim 1 further comprising:
    (a) a clip that has two sides and fits over a lip of the body, the clip having a hole that threadedly engages with the screw; and
    (b) an aperture in the body that provides the clearance necessary to allow the clip to fit over the lip.

3. The non-invasive fastener of claim 2, wherein the lip is integrally formed with the body and is generally perpendicular to the axis of the hole that defines the pivot axis.

4. The non-invasive fastener of claim 1 wherein the head portion of the screw includes a head and a washer, the washer having an outer diameter and an inner diameter, the outer diameter being substantially larger than the diameter of the threaded portion of the screw so that the washer provides a substantial bearing surface for engaging the truck bed liner, and the inner diameter being smaller than the head of the screw.

5. The non-invasive fastener of claim 4 wherein the head portion of the screw further includes a shoulder between the washer and the threaded portion of the screw, the shoulder having a size greater than the inner diameter of the washer to hold the washer fixedly in place.

6. The non-invasive fastener of claim 1 wherein the body has a base and two sides, the finger of the body being formed by the meeting of the base and a side.

7. The non-invasive fastener of claim 1 wherein the body is molded polyethylene.

8. The non-invasive fastener of claim 1 wherein the body further includes a shoulder which abuts against the truck bed liner upon tightening of the screw to limit tightening of the fastener and allow for some displacement between the liner and the truck bed in response to environmental conditions.

9. A truck bed liner for attachment to a truck bed having a pair of opposed side walls, a top rail extending inwardly from each side wall and a side rail extending downwardly from the inner margin of the top rail, the truck bed liner comprising:
    (a) a liner shaped to fit within and closely conform to the inside of a truck bed, the liner having a side wall that fits against a truck bed side wall and covers the length of the truck side wall, the liner side wall having an attachment hole and a flange extending outwardly over the truck bed top rail; and
    (b) a non-invasive fastener that includes
        (i) a screw having a threaded portion and a head portion, the threaded portion being adapted to extend through the hole in the truck bed liner and the head portion being of larger diameter than the threaded portion to prevent passage to the head portion through the hole; and
        (ii) a body having an outer margin and a hole which defines a pivot axis, the outer margin being shaped to form a finger at a point on the outer margin of maximum distance from the pivot axis, the body being threadedly engageable on the screw, the finger being adapted to abut the top rail spaced from the pivot axis to prevent 360° rotation of the body when the screw is rotated so that the body may be tightened and loosened on the screw to respectively secure and disengage the truck bed liner in the truck bed and wherein the body of the non-invasive fastener has a front surface which extends at a first acute angle with respect to the axis of the hole in the body so that the front surface of the body will contact the truck bed side rail at a second acute angle and tightening of the screw will close the second angle and create a pivotal force that will be transferred to the flange of the truck bed liner to engage the flange against the truck bed top rail.

10. The truck bed liner of claim 9 wherein the non-invasive fastener further comprises:
    (a) a clip that has two sides and fits over a lip of the body, the clip having a hole that threadedly engages with the screw; and
    (b) an aperture in the body that provides the clearance necessary to allow the clip to fit over the lip.

11. The non-invasive fastener of claim 10, wherein the lip is integrally formed with the body and is generally perpendicular to the axis of the hole that defines the pivot axis.

12. The truck bed liner of claim 9 wherein the head portion of the screw of the non-invasive fastener further includes a head and a washer, the washer having an outer diameter and an inner diameter, the outer diameter being larger than the hole in the truck bed liner to prevent the passage of the head portion through the hole in the truck bed liner, and the inner diameter being smaller than the head of the screw.

13. The truck bed liner of claim 12 wherein the head portion of the screw of the non-invasive fastener further includes a shoulder between the washer and the threaded portion of the screw, the shoulder having a size greater than the inner diameter of the washer to hold the washer fixedly in place.

14. The truck bed liner of claim 9 wherein the body of the non-invasive fastener has a base and two sides, the finger of the body being formed by the meeting of the base and a side.

15. The truck bed liner of claim 9 wherein the body of the non-invasive fastener is made of polyethylene.

16. The truck bed liner of claim 9 wherein the body of the non-invasive fastener further includes a shoulder which abuts against the truck bed liner upon tightening of the screw to limit tightening of the fastener and allow for some displacement between the liner and the truck bed in response to environmental conditions.

17. A non-invasive fastener comprising: (a) a screw having a threaded portion and a head portion, the head portion being of larger diameter than the threaded portion to prevent passage of the head portion through a hole sized to pass the threaded portion; and (b) a body having an outer margin and a hole located in eccentric relation with the outer margin to define a pivot axis, the outer margin being shaped to form a finger at a point on the outer margin of maximum distance from the pivot axis, the body being threadably engageable on the screw, the finger being adapted to abut a surface spaced from the screw to prevent 360° rotation of the body when the screw is rotated so that the body may thereby be tightened and loosened on the screw, and wherein the body has a front surface which extends from the hole to the outer margin of the body and which near the outer margin is displaced from the hole and extends at a first acute angle with respect the axis of the hole, so that if the front surface of the body is engaged behind a first member to form a second acute angle therewith and the screw is extended through a hole in a second member which is to be fastened to the first member, tightening of the screw will close the second acute angle and will cause the screw to transfer a pivotal force to the second member.

18. The non-invasive fastener of claim 17 further comprising:
 (a) a clip that has two sides and fits over a lip of the body, the clip having a hole that threadedly engages with the screw; and
 (b) an aperture in the body that provides the clearance necessary to allow the clip to fit over the lip.

19. The non-invasive fastener of claim 18, wherein the lip is integrally formed with the body and is generally perpendicular to the axis of the hole that defines the pivot axis.

20. The non-invasive fastener of claim 17 wherein the head portion of the screw includes a head and a washer, the washer having an outer diameter and an inner diameter, the outer diameter being substantially larger than the diameter of the threaded portion of the screw so that the washer provides a substantial bearing surface and the inner diameter being smaller than the head of the screw.

21. The non-invasive fastener of claim 20 wherein the head portion of the screw further includes a shoulder between the washer and the threaded portion of the screw, the shoulder having a size greater than the inner diameter of the washer to hold the washer fixedly in place.

* * * * *